(No Model.)

W. STEERS.
BICYCLE SADDLE.

No. 492,375. Patented Feb. 21, 1893.

WITNESSES
Frank S. Parker
Matthew M. Blunt

INVENTOR
William Steers

UNITED STATES PATENT OFFICE.

WILLIAM STEERS, OF BOSTON, MASSACHUSETTS.

BICYCLE-SADDLE.

SPECIFICATION forming part of Letters Patent No. 492,375, dated February 21, 1893.

Application filed March 30, 1892. Serial No. 427,004. (No model.)

*To all whom it may concern:*

Be it known that I, WILLIAM STEERS, of Boston, in the county of Suffolk and State of Massachusetts, have invented a new and useful Improvement in Bicycle-Saddles, of which the following, taken in connection with the accompanying drawings, is a specification.

The object of my invention is to construct an improved bicycle saddle having an air chamber for the reception of air to act as a cushion, also one or more thicknesses of canvas or other suitable material inserted between the two layers of rubber of which the seat of the saddle is formed.

Figure 1:
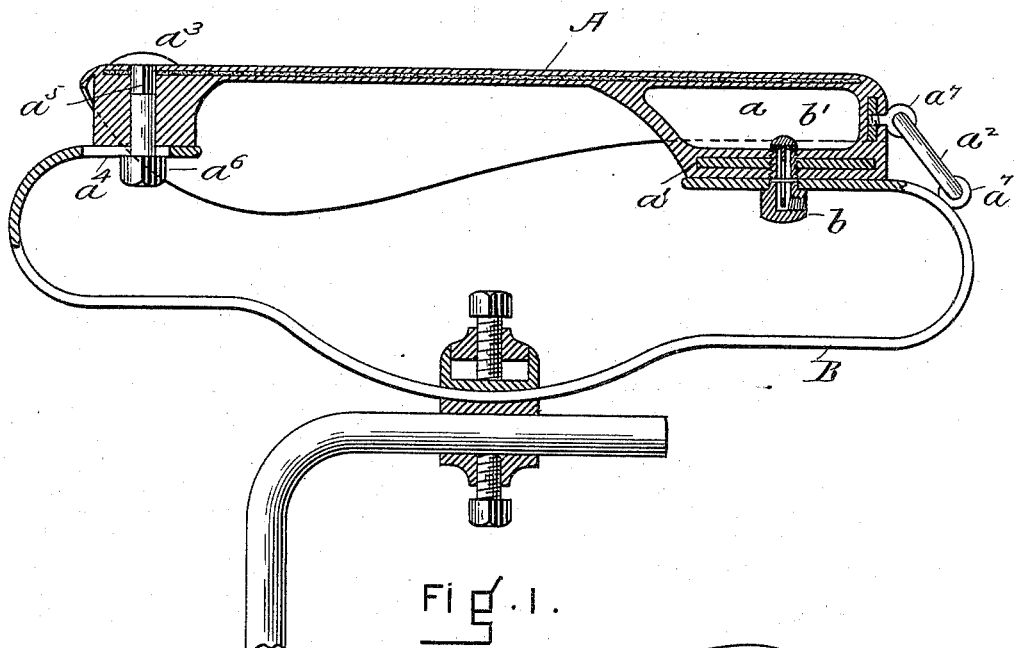
Figure 2:
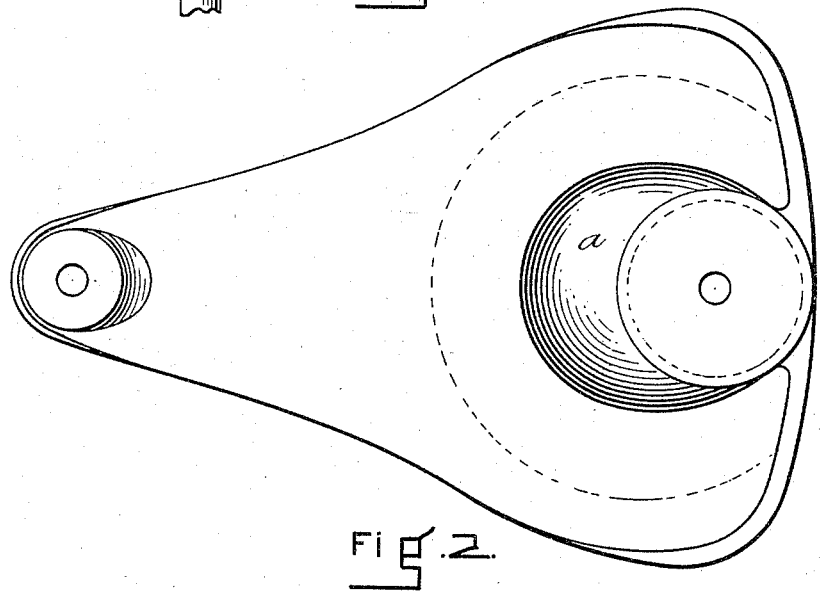

Another feature of my improved saddle is the means used for adjusting its position. I attain these objects by the mechanism illustrated in the accompanying drawings, in which Figure 1, is a sectional view of the saddle. Fig. 2, is a plan view of the under side of the same.

Similar letters refer to similar parts of the views.

The seat of the saddle A is formed of flexible rubber molded in one piece with one or more layers of canvas inserted between the upper and lower layer. An air tight chamber $a$ is formed in the seat having an air inlet $b$ with its self closing valve $b'$, under the air chamber the plate $a'$ is inserted for the sake of rigidity.

The spring B is formed with a slot $a^4$ to receive a bolt $a^3$ having a portion with square surfaces $a^5$ to prevent its turning, it is kept in position by the nut $a^6$. The seat can be moved forward by unscrewing the nut $a^6$ the bolt $a^3$ moving in the slot $a^4$. The brace $a^2$ secured to the spring and saddle by eyelet bolts $a^7$ (to hold this end of the saddle in its proper position to support weight of rider), allowing the saddle to be moved to take up any loose portions or slack and retained in the required position by screwing up the nut $a^6$. The air chamber $a$ may be made larger and with more surface under the seat if required.

Having fully described my invention, what I wish to claim is—

The herein described bicycle saddle consisting essentially of a saddle S, formed of rubber having one or more thicknesses of canvas or other suitable material inserted between the upper and lower layers of the rubber forming the seat, said saddle provided with an air chamber $a$, with its self-closing air inlet valve $b$ and $b'$, retaining brace $a^2$ and eyelets $a^7$, and bolt $a^3$, adapted to move in a slot $a^4$, in frame B, said bolt having a portion with square surfaces $a^5$, and kept in position by the nut $a^6$, all constructed and adapted to operate substantially as described and for the purpose set forth.

In testimony whereof I have signed my name to this specification, in the presence of two subscribing witnesses, on this 26th day of March, A. D. 1892.

WILLIAM STEERS.

Witnesses:
 FRANK G. PARKER,
 MATTHEW M. BLUNT.